(12) United States Patent
Forest et al.

(10) Patent No.: US 10,966,310 B1
(45) Date of Patent: Mar. 30, 2021

(54) HIGH-ENERGY PLASMA GENERATOR USING RADIO-FREQUENCY AND NEUTRAL BEAM POWER

(71) Applicant: Wisconsin Alumni Research Foundation, Madison, WI (US)

(72) Inventors: Cary Brett Forest, Madison, WI (US); Jay Keith Anderson, Madison, WI (US); John Philip Wallace, Madison, WI (US); Robert W. Harvey, Oceanside, CA (US); Yuri V. Petrov, Cypress, TX (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/839,780

(22) Filed: Apr. 3, 2020

(51) Int. Cl.
*H05H 1/46* (2006.01)
*G21B 1/05* (2006.01)
*G21B 1/23* (2006.01)

(52) U.S. Cl.
CPC ............... *H05H 1/46* (2013.01); *G21B 1/05* (2013.01); *G21B 1/23* (2013.01); *H05H 2001/4682* (2013.01)

(58) Field of Classification Search
CPC .. H05H 1/14; H05H 1/16; H05H 1/04; H05H 1/46; H05H 2001/4682; G21B 1/05; G21B 1/052; G21B 1/23; G21B 3/00; Y02E 30/00; Y02E 30/10
See application file for complete search history.

(56) References Cited

U.S. PATENT DOCUMENTS

| | | | | | |
|---|---|---|---|---|---|
| 4,240,873 | A | * | 12/1980 | Linlor | G21B 3/006 376/107 |
| 4,314,879 | A | * | 2/1982 | Hartman | G21B 1/052 376/128 |
| 4,826,646 | A | * | 5/1989 | Bussard | H05H 1/02 376/129 |
| 7,119,491 | B2 | * | 10/2006 | Rostoker | H05H 1/10 315/111.21 |
| 7,482,607 | B2 | * | 1/2009 | Lerner | H05G 2/003 250/493.1 |
| 8,031,824 | B2 | * | 10/2011 | Bystriskii | H05H 1/46 376/107 |
| 8,593,064 | B2 | * | 11/2013 | Chang Diaz | H05H 1/46 315/111.61 |
| 9,997,261 | B2 | * | 6/2018 | Tuszewski | G21B 1/052 |
| 10,049,774 | B2 | * | 8/2018 | Tuszewski | H05H 1/14 |

OTHER PUBLICATIONS

Harvey et al.; "3D distributions resulting from neutral beam, ICRF and EC heating in an axisymmetric mirror." In AIP Conference Proceedings, vol. 1771, No. 1, p. 040002. AIP Publishing LLC, 2016.

* cited by examiner

*Primary Examiner* — Haissa Philogene
(74) *Attorney, Agent, or Firm* — Boyle Fredrickson, S.C.

(57) ABSTRACT

An apparatus for generating a highly energetic plasma employs a low-energy neutral beam injected into a magnetically contained mirror plasma to produce plasma ions boosted in energy to fusion levels by a coordinated radiofrequency field.

17 Claims, 2 Drawing Sheets

HIGH-ENERGY PLASMA GENERATOR USING RADIO-FREQUENCY AND NEUTRAL BEAM POWER

STATEMENT REGARDING FEDERALLY SPONSORED RESEARCH OR DEVELOPMENT

This invention was made with government support under DE-SC0002322 awarded by the US Department of Energy. The government has certain rights in the invention.

BACKGROUND OF THE INVENTION

The present invention relates to an apparatus for generating high-energy plasmas that can promote nuclear fusion, and in particular, to systems using magnetic mirror confinement and neutral beam injection, with additional radiofrequency power injection.

High-temperature plasmas can be confined away from a physical container and avoiding damage to the container and possible plasma quenching, by a magnetic mirror confinement system. Such confinement systems may provide an axial magnetic field extending between two ends at which the magnetic flux lines converge. Plasma ions moving within this axial magnetic field spiral along the flux lines at the local cyclotron frequency and are "reflected" by an axial component of magnetic force acting on the spiraling ions. This reflecting magnetic force caused by the flux line convergence and concomitant increasing magnetic field strength is in the direction away from the convergence. Moreover, the reflecting force is proportional to the particle kinetic energy component which is perpendicular to the magnetic field. A similar reflecting force acts on the plasma electrons.

Nuclear fusion can be promoted in a magnetic mirror confinement system by generating plasma with sufficiently high energy and density. One method of reaching this high-energy/density state injects electrically neutral particles (a neutral beam) through the magnetic containment field into the plasma where the neutral particles of the neutral beam are ionized, that is, split into plasma ions and electrons. The neutral beam has an initial energy above that necessary for fusion so that the resulting plasma ions maintain an energy suitable for fusion even with an expected collisional loss of energy of the plasma ions after introduction into the plasma. The plasma density and energy are determined by the loss rate of the fast ions injected by neutral beams which decreases with increasing beam energy; hence high energy ions are better confined than low energy ions.

A neutral beam generating a sufficient flux of highly energetic particles at energies sufficient to maintain high fusion output in a magnetic mirror confinement system is difficult and costly from an energy standpoint. Currently, such an approach does not appear to be practical for net fusion energy generation.

SUMMARY OF THE INVENTION

The present invention also injects a neutral beam injection into a magnetic mirror confinement but differs from the previous approaches by employing a low-energy neutral beam having far less energy than needed to produce significant fusion directly. Instead, after the neutral beam is ionized, the energy of those neutral beam sourced fast ions is boosted within the magnetic containment volume by using a radiofrequency electrical field. The difficulties of preferentially transferring radiofrequency energy to the fast-neutral beam ions rather than thermal ions is overcome by controlling the injection angle and energy of the neutral beam so that there is a well-defined "turning point" of the fast ions in the magnetic containment field. Tuning the radiofrequency waves to a multiple (i.e. a harmonic) of the cyclotron frequency at the turning point, preferentially energizes these neutral beam injected ions to fusion levels with only small expected wave damping effects on thermal ions.

Specifically, then, in one embodiment, the invention provides an apparatus for producing high-energy plasma in a magnetic mirror containment field, the latter providing axially-extending magnetic flux lines converging at opposed first and second ends of a containment volume holding the plasma. A neutral beam generator directs a neutral beam of particles into the containment volume at a predetermined pitch angle with respect to the magnetic field and an energy range so that the particles disassociate into plasma ions at the same pitch angle within the containment volume and have a well-defined turning point. At the turning point, fast ions have purely perpendicular energy. A radiofrequency generator can then be used to produce an t electrical field to accelerate the beam-sourced ions to an energy sufficient for fusion of the plasma ions.

It is thus a feature of at least one embodiment of the invention to provide a system for boosting the energy of the plasma ions after injection into the containment field, greatly increasing the efficiency of the neutral beam.

The frequency of the electrical field may be functionally dependent on a cyclotron frequency at turning points for the plasma ions of the neutral beam in the magnetic mirror containment field.

It is thus a feature of at least one embodiment of the invention to preferentially deposit energy in the plasma ions having a matching cyclotron frequency.

In one embodiment, the frequency of the electrical field may be a harmonic of the cyclotron frequency at the turning point, greater than than the cyclotron frequency.

It is thus a feature of at least one embodiment of the invention to exploit preferential transfer of radiofrequency electrical energy to resonant fast ions that occurs at higher cyclotron harmonics.

The energy of the neutral beam is set so that more than 50 percent of the neutral beam particles are converted to plasma ions.

It is thus a feature of at least one embodiment of the invention to permit the use of a lower energy neutral beam amenable to higher particle flux and thus capable of high plasma densities.

The neutral beam may have an energy of less than 50,000 electron volts.

It is thus a feature of at least one embodiment of the invention to allow setting the trade-off in the design of the neutral beam generator for high flux rates rather than high energies thereby improving ion fueling rates.

The radiofrequency generator may boost the energy of the plasma ions from the neutral beam by more than 2 times.

It is thus a feature of at least one embodiment of the invention to provide significant energy boosting of the plasma ions after injection.

The radiofrequency generator may include an antenna positioned to be proximate to a reflection limit of the plasma ions and to generate a rotating electric vector perpendicular to the axis of the magnetic mirror containment field.

It is thus a feature of at least one embodiment of the invention to optimize the antenna for energy deposition of the plasma ions.

The angle of the neutral beam may be between 15° and 80° to the axis.

It is thus a feature of at least one embodiment of the invention to provide a good trade-off between energy of the neutral beam and a turn-around point that isolates the neutral beam from thermal ions.

The apparatus may further include a treatment volume at least partially surrounding the containment volume to receive high-energy neutrons therethrough and containing an element for transmutation into a different element.

It is thus a feature of at least one embodiment of the invention to provide a system for treatment of materials with neutrons, for example, to create radiopharmaceuticals or to revitalize spent nuclear fuel.

The neutral beam may be selected from the group consisting of deuterium and tritium and in some embodiments the system may use deuterium only with respect to the neutral beam and the gas in the containment volume.

It is thus a feature of at least one embodiment of the invention to provide a system that can work with well-understood neutral beam materials and in some cases that can avoid the use of tritium in favor of deuterium.

In one embodiment, the invention may be employed to create a fusion apparatus having a reaction volume holding a fusible material within a first axially-extending magnetic containment field. In this embodiment, a first and second plasma plug may flank the reaction volume along the axis, each plasma plug being the apparatus for producing high-energy plasma as described above, wherein plasma ions escaping from the first and second plasma plugs produce a fusion reaction in the reaction volume.

It is thus a feature of at least one embodiment of the invention to provide an improved design for a fusion device for providing transmutation or power generation.

These particular objects and advantages may apply to only some embodiments falling within the claims and thus do not define the scope of the invention.

DETAILED DESCRIPTION OF THE PREFERRED EMBODIMENT

Figure 1:
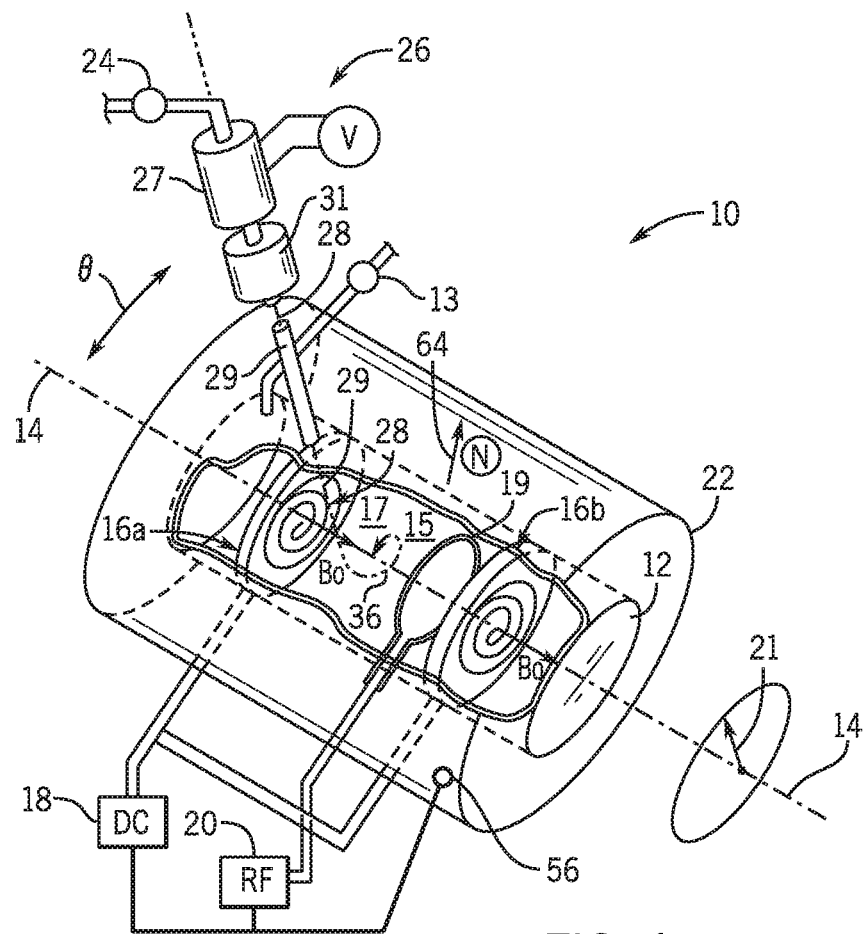
FIG. 1 is a perspective, cutaway view of a first embodiment of the invention providing a magnetic mirror containment field, a neutral beam generator for directing beams into the containment volume, and a radiofrequency generator producing an electric field acting on plasma ions from the neutron beam generator.

Referring now to FIG. 1, a high-energy plasma system 10 may provide a pressure vessel 12, for example, in the form of a sealed cylindrical shell of stainless steel or the like, extending along an axis 14 for receipt of a reaction gas, such as deuterium or tritium, through valve inlet assembly 13 from a pressure tank or the like (not shown).

First and second electromagnetic coils 16a and 16 may be positioned within the pressure vessel 12 near the opposed ends of the pressure vessel 12 to define a containment volume 17 therebetween having a magnetic containment field 15. The electromagnetic coils 16 are oriented and separated to form a Helmholtz pair aligned along axis 14 for establishing an axial Bo field therebetween. In one embodiment, the electromagnetic coils 16 may be pancake coils providing spirals about axis 14 powered by an external, controllable DC power supply 18 of the type understood in the art.

Positioned between the electromagnetic coils 16 but proximate to one electromagnetic coil 16b is a radiofrequency antenna 19 (shown in simplified form), for example, providing a circularly polarized radio field extending along axis 14 when driven by a radiofrequency generator 20. As is understood in the art, the polarized radio field provides an electrical vector 21 perpendicular to axis 14 rotating thereabout. Further discussion of loop antennas suitable for this purpose are found in T. H. Stix, "Fast Wave Heating of a Two-Component Plasma," Nuclear Fusion 15, 737 (1975) and R. W. Harvey, M. G. McCoy, G. D. Kerbel, and S. C. Chiu, "ICRF Fusion Reactivity Enhancements in Tokamaks," Nuclear Fusion 26, 43 (1986) hereby incorporated by reference.

A treatment volume 22 may be located radially outside the pressure vessel 12, for example, in the form of a concentric outer cylindrical tank which may be filled with, for example, an aqueous material for transmutation by high-energy neutrons such as precursors to medical isotopes $^{99}$Mo (molybdenum 99), $^{131}$I (iodine 131), $^{133}$Xe (xenon 133), and $^{177}$Lu (lutetium 177) or which may support racks holding spent nuclear fuel rods being rejuvenated through transmutation by high-energy neutrons.

A neutral beam generator 26 is positioned to inject a beam 28 of neutral particles 29 (that is non-ionized particles having zero net charge) at a pitch angle θ into the containment volume 17. The pitch angle θ is defined as an acute angle between an angle of the beam 28 and the axis 14. The neutral particles 29, for example, are atoms of deuterium or tritium introduced through a gas line 24 and ionized by a local plasma (not shown). These ions are accelerated in an accelerator chamber 27 having a successive set of electrically charged plates as is generally understood in the art. The ions then pass through a neutralizing gas cell 31 to produce neutral particles 29 by a charge exchange process to produce the neutral particles 29 of the beam 28.

Figure 2:
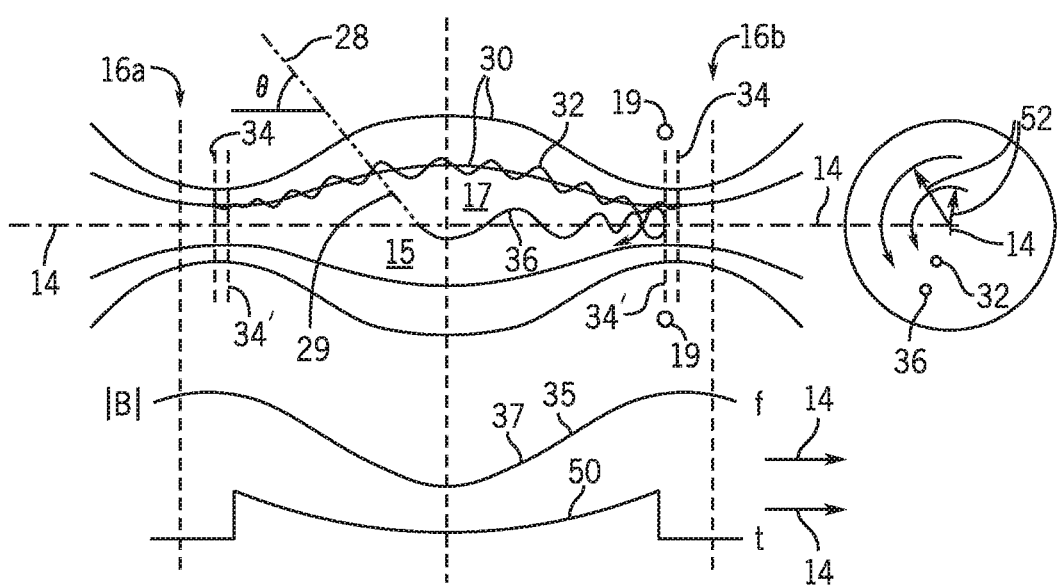
FIG. 2 is a side, elevational view of flux lines of the containment volume of FIG. 1, aligned with an end view of those flux lines, both of these views showing trajectories of plasma ions of different energies, as well as graphs of cyclotron frequency, dwell time and electric field strength as a function of axial distance.

Referring now also to FIG. 2, the magnetic flux lines 30 generated by the coils 16 will produce a "bottle" shape expanding radially from the axis 14 at a midpoint between the coils 16 and contracting radially at the location of the coils 16. As is generally understood in the art, this configuration produces a mirror containment volume where randomly distributed "thermal" plasma ions of sufficient pitch angle 32 spiral around flux lines 30 between regions defined by turning points 34.

These thermal plasma ions can be established in a variety of ways for example by using the radiofrequency antenna 19 (albeit at a low efficiency) or a separate heating system using high-frequency microwaves producing electron cyclotron resonance heating, as is understood in the art At the regions of the turning points 34, the thermal plasma ions 32 reverse direction caused by increasing axial components of the magnetic Lorentz force produced by the convergence of the flux lines 30. The frequency 35 of the spiraling about the flux lines 30 is termed the "cyclotron frequency" and is a function of the strength of the magnetic field 37 along axis 14, and for this reason the cyclotron frequency 35 generally increases toward the electromagnetic coils 16. For ions of equal mass and charge, the cyclotron frequencies will be nominally identical at a given location along the axis 14, independent of the velocities or energies of the ions; however, ions 32 of equal mass having different pitch angles will normally have different turning points 34.

The velocity and hence the energy of the neutral particles 29 of the neutral beam 28 and the pitch angle θ of the neutral beam 28 are set so the majority, for example, greater than 50 percent, of the particles of the neutral beam 28 will be ionized into plasma ions 36 within the containment volume 17 before exiting the containment field. These plasma ions 36 at the same pitch angle, now having electrical charge, are captured by the magnetic flux lines 30 to increase the plasma density.

In order to promote this entrapment of the majority of the neutral particles 29 of the neutral beam 28, the energy of the neutral beam 28 is limited to provide sufficient time-of-flight for the neutral particles 29 to be ionized. Generally, the desirable energy of the neutral beam 28 for ionization will be well below the kinetic energy required for substantial fusion, and typically less than 100 thousand electron volts or preferably less than 50,000 electron volts and more typically on the order of 15-25 keV. This is in contrast to prior art approaches which require neutral particles 29 with energies exceeding the energy necessary to promote fusion between the plasma ions 36 and typically having energies more than than one million electron volts for D-D fusion. By limiting the energy of the neutral beam 28, a trade-off may be affected in common neutron beam generators 26 to produce a higher flux density of neutral particles 29, also increasing the plasma density.

Referring still to FIGS. 1 and 2, the pitch angle θ of the neutral beam 28 is selected to provide predetermined turning points 34' along axis 14 for the resulting plasma ions 36 and thus to provide a corresponding predetermined cyclotron frequency 35 of the plasma ions 36 at the turning points 34'. This cyclotron frequency is used to set the frequency of the radiofrequency generator 20 as will be discussed below.

In addition, the antenna 19 is placed proximate to one of the turnaround points 34' to provide a maximum field strength in that region.

Finally, within the energy levels for the neutral beam 28 that provide the desired capture of the neutral particles 29 within the containment volume 17, the energy of the neutral beam 28 is set to be as high as possible so that the radius of orbit of the of the plasma ions 36 produced by the neutral beam 28 (gyro-orbit 52) is higher than the average distribution gyro-orbit 52 of "thermal ions" 32, being ions not immediately derived from the neutral beam 28.

While the inventors do not wish to be bound by a particular theory, the above-described: (a) setting of the cyclotron frequency of the radiofrequency generator 20 to a harmonic of the cyclotron frequency of the plasma ions 36 at the turning point 34', (b) boosting of the energy of the plasma ions 36 above the average distribution of the thermal plasma ions 32, and (c) maximizing the electrical field strength at the turning point 34', all work together to allow the radiofrequency generator 20 to preferentially boost the energy of the plasma ions 36 from the neutral beam 28 free from the damping effect of thermal plasma ions 32.

In this regard, the setting of the radiofrequency generator 20 (per (a)) provides preferential coupling to the plasma ions 36 having a matching (e.g., a harmonically related) cyclotron frequency 35, in contrast to thermal plasma ions 32 having a range of different Doppler-shifted cyclotron frequencies and less effective coupling. The coupling may be proportional to the square of the Bessel function $B_{n-1}(k_\perp * v_\perp / \omega_{ci})$ where:

n is the resonant cyclotron harmonic number of the injected wave, $k_\perp$ the perpendicular wave number, and $\omega_{ci}$ is the cyclotron frequency of the resonance ions.

The quantity $k_\perp / \omega_{ci}$ may may be $\sim v_A$, the Alfven velocity of the ions (cf. T. H. Stix, "Fast Wave Heating of a Two-Component Plasma," Nuclear Fusion 15, 737 (1975)). Given the dependence of the Bessel function on $v_\perp$, the coupling is proportional to powers of the perpendicular velocity of the ions, and can be adjusted to preferentially damp on hot tail ions from the neutral beam and and on those diffused to higher energy by the radiofrequency waves.

Further, by setting the frequency of the radiofrequency generator 20 according to the cyclotron frequency 35 at the turning point 34', the influence of the electrical field from the radiofrequency generator 20 on the plasma ions 36 is increased because of the prolonged dwell time 50 of the plasma ions 36 at the turning point 34' during their lowest axial velocity as they turn around. This is in contrast, for example, to thermal plasma ions 32 which move quickly through this zone to further turning points 34 or which do not reach as far as the turning point 34'.

As noted above, by boosting the energy of the plasma ions 36 above the distribution of thermal plasma ions 32 (per (b)) and by setting the RF generator 20 to an RF frequency which is a high harmonic of the cyclotron frequency 35 of the plasma ions 36, higher energy plasma ions 36 having a higher radius of gyro-orbit 52 preferentially absorb power over the thermal plasma ions 32 having a lower gyro-orbit 52. In some embodiments, the RF frequency may be set to a range from 20 to 100 megahertz and/or to a harmonic n greater than n=2 and preferably n=4.

Generally, the higher harmonics boost the relationship between energy absorption and gyro-orbit 52 according to increasing Bessel function numbers associated with those harmonics. Specifically, energy absorption will be proportional to $J_{n-1}(k_\perp \rho)$ where: $J_{n-1}$ is the Bessel coefficient for a given harmonic n, ρ is the radius of the particle's gyro-orbit 52 about the magnetic flux lines 30 which increases with energy by $$\rho = \frac{\sqrt{2mE}}{eB}$$

and $k_\perp$ is a wave number of the plasma ions 36 being a property of the wave within the plasma and the polarization of the antenna 19 launching the wave.

It will be appreciated that this effective preferential absorption of energy by the plasma ions 36 will be self-reinforcing as energy is absorbed and the gyro-orbit of the plasma ions 36 is increased.

Finally, by placing a highest field strength of the antenna 19 near the turning point 34', the plasma ions 36 are preferentially influenced.

Generally, the magnetic containment field 15 will tend to lose some plasma ions 32 having low pitch angles through its ends. These particles are said to be in the "loss cone." By boosting the population of the plasma ions 36 having a known pitch angle θ outside of the loss cone, increased plasma densities can be obtained.

While the cyclotron frequency of the plasma ions 36 near the turning point 34', and hence the desired setting of the frequency of the radiofrequency generator 20, is primarily a function of the vacuum magnetic field strength 37, it will shift slightly as a function of increasing plasma density/pressure. Accordingly, the invention contemplates that either or both of the DC power supply 18 or the RF frequency generator 20 may be adjusted during operation to maintain the above relationships which boost energy transfer to the plasma ions 36. In particular, this adjustment may be made via a closed-loop feedback control using a sensor 56 detecting plasma pressure, for example, using a diamagnetic loop, which will measure the decrease in magnetic field due to increased plasma pressure to ensure a matching of the excitation frequency of the RF generator 20 with the actual and dynamic cyclotron frequency 35 at the turnaround point 34'. To the extent that the cyclotron frequency is dictated by the total field (vacuum field from coil plus plasma diamagnetism); the invention also contemplates that no frequency change may be required but the location of the turning point will move closer to the electromagnetic mirror coil.

Figure 3:
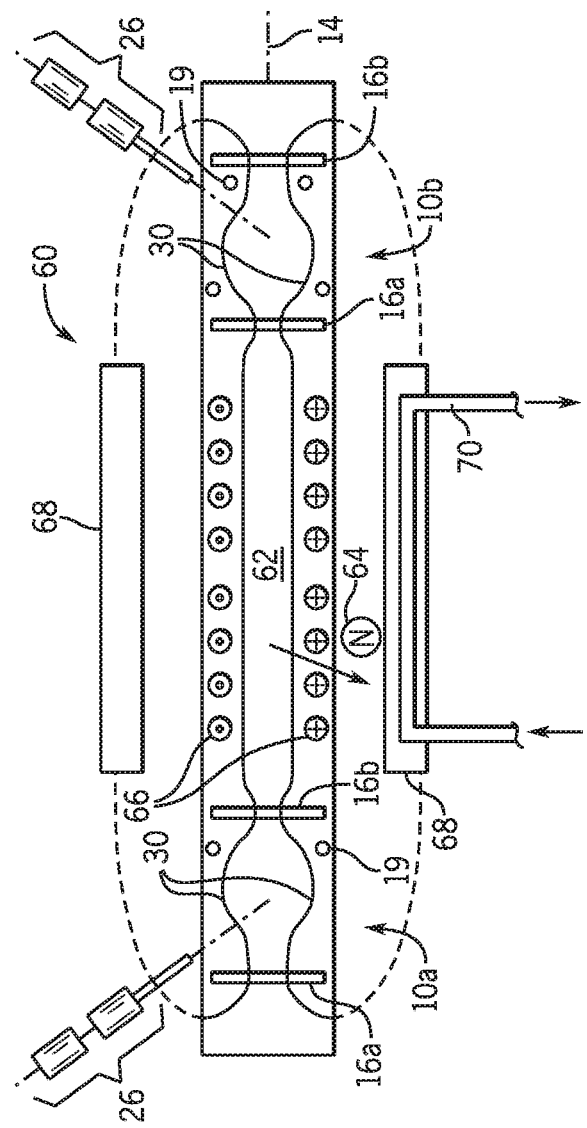
FIG. 3 is a simplified elevational cross-section of a fusion apparatus employing the magnetic mirror containment fields of FIG. 1 as plugs blocking the escape of high-energy plasma ions from the central solenoidal magnetic field cell.

Referring now to FIG. 3, this benefit of the present invention in providing high plasma densities makes it useful as part of a system where two high-energy plasma systems 10 may act as "plugs" to trap high-energy plasma ions in a larger scale neutron generator 60 for the purpose of transmutation (as discussed above) or fusion power generation. Such a design, for example, may make use of a tandem mirror scheme, for example, described at G. Dimov, V. Zakaidakov, and M. Kishinevski, Fiz. Plazmy 2 597 (1976), [Sov. J. Plasma], Phys 2, 326 (1976)] and T. K. Fowler and B. G. Logan, Comments on Plasma Physics and Controlled Fusion 2, 167 (1977) and hereby incorporated by reference.

More specifically, in such a tandem mirror neutron generator 60, first and second high-energy plasma systems 10a and 10b are placed in opposition along axis 14 flanking a generator volume 62. Generally, the high-energy plasma systems 10 will have an axial length on the order of 2 meter whereas the generating volume 62 will be much larger, for example, on the order of 50 meters or more.

The electromagnetic coils 16 of both of the high-energy plasma systems 10a and 10b are axially aligned to provide a same direction of polarization of the magnetic field along the common axis 14. As such, the flux lines 30 of the first high-energy plasma system 10a may continue through the volume 62 to the second high-energy plasma system 10b. Within the volume 62, the flux lines 30 are focused by an axially-extending solenoid coil 66 circling the axis 14 around the volume 62.

For this purpose, the electromagnetic coils 16 may be superconducting magnets for example per D. Whyte, J. Minervini, B. LaBombard, E. Marmar, L. Bromberg, and M. Greenwald, "Smaller and sooner Exploiting high magnetic fields from new superconductors for a more attractive fusion energy development path," Journal of Fusion Energy, 35, 41 (2016) also hereby incorporated by reference.

A subset of thermal plasma ions 32, having a uniform distribution of pitch angles and having been boosted to higher energies by kinetic transfer from the plasma ions 36, may escape from the high-energy plasma systems 10 into the volume 62 containing a reactant gas, for example, deuterium or tritium, to promote fusion and the emission of neutrons 64 from the volume 62. The high pressure of the high-energy plasma systems 10 blocks the escape of high-energy plasma ions from the volume 62 to maintain the high densities for significant fusion.

The volume 62 may be surrounded by a contained volume 22 which may include a heat exchanger liquid 68, for example, for receiving, through one or more heat exchangers, a working fluid 70 of a thermodynamic engine such as a turbine or the like, for example, for the generation of electrical power. Alternatively, the contained volume 22 may be used for the transmutation of materials to generate medical isotopes or to rejuvenate spent nuclear fuel as discussed above.

The present application incorporates disclosure of US patent application 2019/0326029 entitled: Apparatus and Method for Generating Medical Isotopes, and US application 2013/0142296 entitled: Apparatus and method for generating medical isotopes which describe additional techniques for managing isotope transmutation including the use of neutron multiplier generators and other construction details and mechanisms for producing a neutral beam discussed above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An apparatus for producing high-energy plasma comprising:
    a magnetic mirror containment field providing axially-extending magnetic flux lines converging at opposed first and second ends of a containment volume holding a plasma;
    a neutral beam generator directing a neutral beam of particles into the containment volume at a predetermined pitch and energy so that the particles disassociate into plasma ions within the containment volume, and
    a radiofrequency generator producing an electrical field to accelerate the plasma ions to an energy sufficient for fusion of the plasma ions.

2. The apparatus of claim 1 wherein the frequency of the electrical field is functionally dependent on a cyclotron frequency at turning points for the plasma ions of the neutral beam in the magnetic mirror containment field.

3. The apparatus of claim 2 wherein the frequency is a harmonic of the cyclotron frequency greater than the cyclotron frequency.

4. The apparatus of claim 1 wherein the energy of the neutral beam is set so that more than 50 percent of the neutral beam particles are converted to plasma ions.

5. The apparatus of claim 1 wherein the neutral beam has an energy of less than 50,000 electron volts.

6. The apparatus of claim 1 wherein the radiofrequency generator boosts the energy of the plasma ions from the neutral beam by more than 2 times.

7. The apparatus of claim 1 wherein the radiofrequency generator includes an antenna positioned to be proximate to a reflection limit of the plasma ions and to generate a rotating electric vector perpendicular to the axis of the magnetic mirror containment field.

8. The apparatus of claim 7 wherein the pitch is between 30° and 60° to the axis.

9. The apparatus of claim 1 further including a treatment volume at least partially surrounding the containment volume to receive high-energy neutrons therethrough and containing an element for transmutation into a different element.

10. The apparatus of claim 9 wherein the element for transmutation is a precursor to a a medical radioisotope selected from the group consisting of precursors $^{99}$Mo, $^{131}$I, $^{133}$Xe; and $^{177}$Lu.

11. The apparatus of claim 9 wherein the element for transmutation is an exhausted nuclear fuel.

12. The apparatus of claim 1 wherein the neutral beam is selected from the group consisting of deuterium and tritium.

13. The apparatus of claim 1 wherein the neutral beam is deuterium.

14. The apparatus of claim 1 wherein including a pair of magnetic coils producing the magnetic mirror containment field and wherein the radiofrequency generator provides an antenna between the magnetic coils and wherein the containment volume is contained within a gas-tight chamber.

15. A fusion apparatus comprising:
a reaction volume holding a fusible material within a first axially-extending magnetic containment field;
a first and second plasma plug flanking the reaction volume along the axis; each plasma plug including:
(a) a magnetic mirror containment field providing axially-extending magnetic flux lines converging at opposed first and second ends of a containment volume holding a plasma;
(b) a neutral beam generator directing a neutral beam of particles into the containment volume at a predetermined pitch and energy so that the particles disassociate into plasma ions within the containment volume; and
(c) a radiofrequency generator producing an electrical field to accelerate the plasma ions to an energy above that of the particles entering the containment volume;
whereby plasma ions escaping from the first and second plasma plug produce a fusion reaction in the reaction volume.

16. The fusion apparatus of claim 15 wherein a pressure of plasma ions within the first and second plasma plug is greater than a pressure of plasma ions within the reaction volume.

17. The fusion apparatus of claim 16 further including an electrical generator receiving neutrons from the reaction volume to generate electrical power.

* * * * *